UNITED STATES PATENT OFFICE.

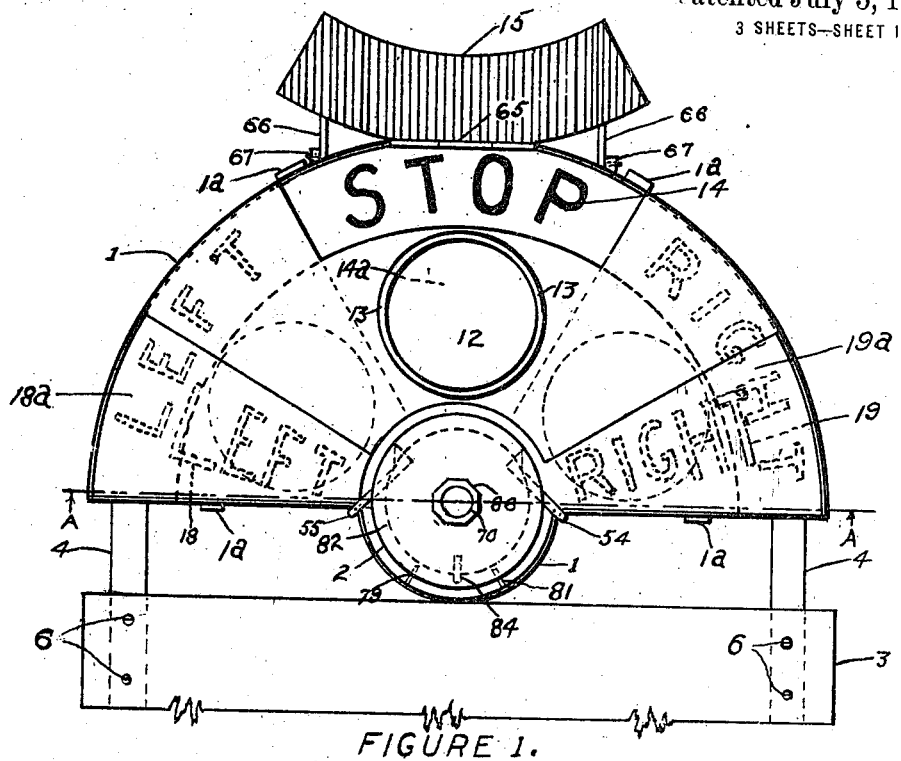

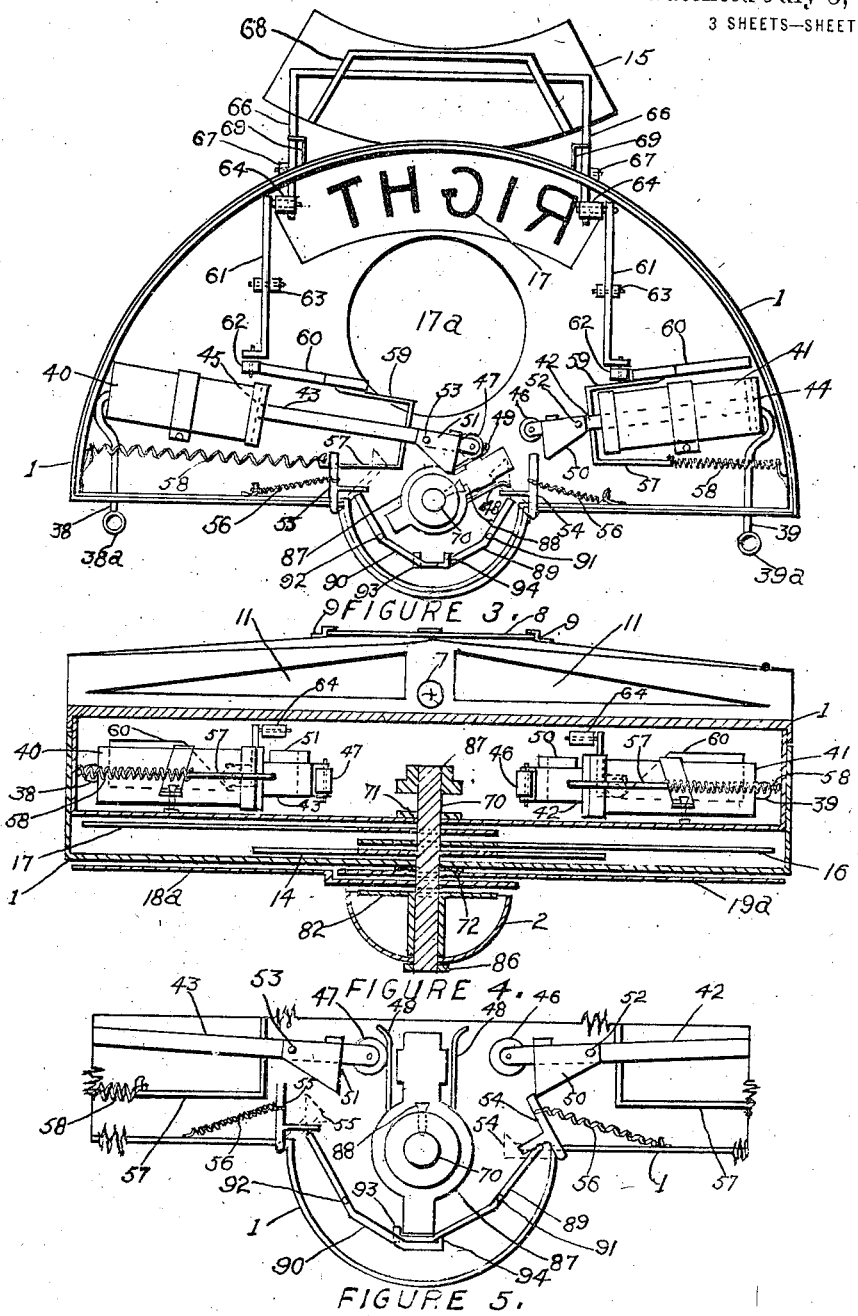

WILLIAM E. HART, OF HIGHLAND SPRINGS, CALIFORNIA.

TAIL-LIGHT AND SIGNAL FOR AUTOMOBILES.

1,231,736. Specification of Letters Patent. Patented July 3, 1917.

Application filed December 20, 1915. Serial No. 67,796.

*To all whom it may concern:*

Be it known that I, WILLIAM E. HART, a citizen of the United States, and a resident of Highland Springs, Lake county, State of California, have invented a certain new and useful Improvement in Tail-Lights and Signals for Automobiles, of which the following is a specification.

My invention relates to improvements in tail lights and signals for automobiles, and the objects of my invention are:

First, to provide in connection with said tail lights, signals that can be operated in the day when no light is shown;

Second, to provide operative tail lights and signals for automobiles that may be operated day or night, showing that the leading automobile is either going to stop, or turn to the left, or to the right, as the case might be, and one in which the license number of an automobile will be distinctly seen night or day, at all times.

A still further object of my invention is generally to improve this class of tail lights and signals so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which—

Figure 1 is a front elevation of my device, assembled, showing position of signals, bell, and license number plate;

Fig. 2 is a rear elevation showing position of the tail light, and means by which said light illuminates the license number plate and signals;

Fig. 3 is a rear view of the mechanism of my device, showing night signal in position, right;

Fig. 4 is a section on line A—A of Fig. 1;

Fig. 5 is a detail view of the signal device in position of "Stop", showing safety fulcrum rods in position;

Corresponding and like parts are referred to in the following description and indicated in all the views of the drawings by the same reference numbers.

Figure 6:
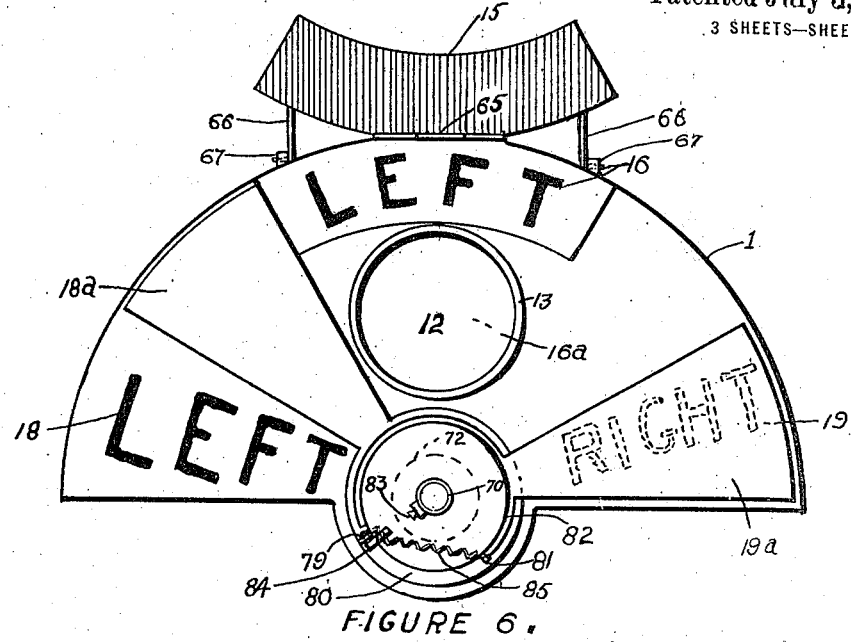
Fig. 6 is a detail view of the day and night signals, exposed; left, showing mechanism of operation.
Figure 7:
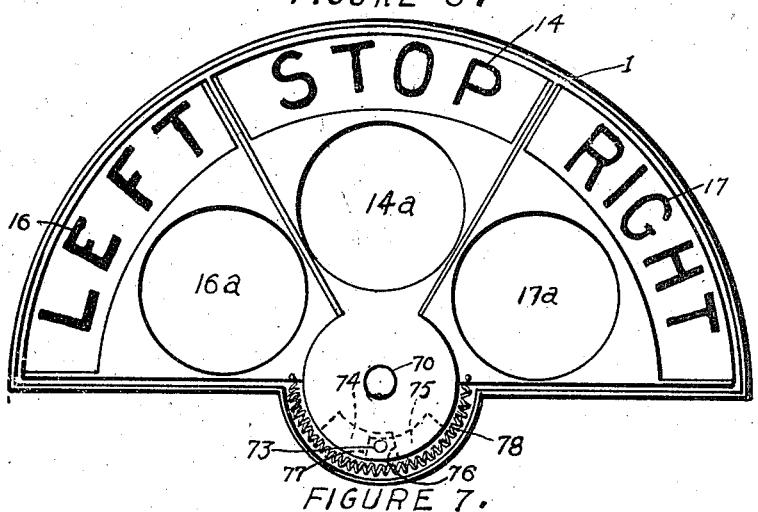
Fig. 7 is a detail view of the night signals, "Left", "Stop", and "Right"
Figure 8:
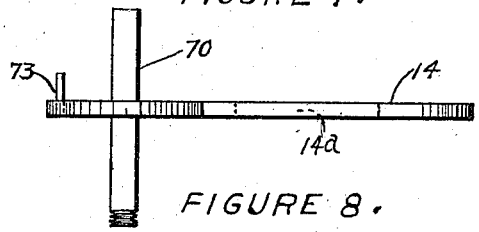
Fig. 8 is a detail view of main shaft with night signal "Stop" fastened thereto, adapted to operate night signals, "Right" and "Left".

My improved tail lights and signals forming the subject matter of the present invention, comprises a body casing 1 having front and back plates, the same being made of sheet metal; metal straps are shown at $1^a$, adapted to fasten the front and back plates together. Body casing 1 is fastened to the rear end of an automobile in any suitable manner, or to the rear end of any other vehicle on which the same may be used; to this body casing 1 is attached the operative and non-operative parts of my device; a bell is shown at 2; the same rings at every change of the signals, which will be more fully hereinafter described; license number plate 3 is here shown fastened to rear part of body casing 1 by metallic strips 4, and bolts 5 and 6. The inside of the rear portion of casing 1 is plated with a reflecting material for the purpose of reflecting the light to all of the signals. A light is shown at 7 fastened to holder 8, and attached to the rear portion of casing 1 by fasteners 9; a hole 10 is shown in dotted lines cut through the rear portion of casing 1 to admit said light to the inner portion thereof, said light reflecting down through openings 11; said openings may be covered with glass or any other suitable material that will throw a strong light upon number plate 3; night signal is shown at 12 in Fig. 1, which is of white frosted glass, the same being fastened in place on casing 1 by frame 13, red light reflecting through holes cut in front portion of casing 1, showing a red light when in position; night signal stop 14 and $14^a$ is shown in red light in Fig. 1, when uncovered by red day signal 15; night signal 16 and $16^a$, left, when shown exposed as in Fig. 6, a yellow light or any other colored light that may be prescribed by law can be shown, night signal 12 changing to same color at the same time. Night signal 17 and $17^a$, right, is shown in Fig. 3 in green light, or any other colored light prescribed by law, night signal 12 changing to same color at the same time. The different colored lights here mentioned are shown by the removable signals being provided with glasses of various colors. Day signal 18, left, as exposed in Fig. 6, is painted on the front left portion of body casing 1, and is exposed by shutter 18ª. Day signal 19, right, is painted on the front right portion of body casing 1, and is shown in dotted lines in Fig. 6, said signal 19, right, being covered by shutter 19ª. Day signal 15, indicating "stop", is painted red on its signal side; when this signal is up, it denotes "stop". These night and day signals are operated by cylinders 40—41 and their connections, by compressed air taken from any suitable source through the pipes 38—39. Piston rods are shown at 42—43; piston heads are shown at 44—45; on the ends of said piston rods are shown rollers 46—47; these rollers are adapted to reduce friction when the same comes in contact with springs 48—49. Trip blocks are shown at 50—51, connected to piston rods 42—43 by fulcrum pins 52—53; these trip blocks come in contact with bell clappers 54—55, and ring bell 2, when piston rods 42—43, are forced outward by compressed air admitted to cylinders 40—41. Springs are shown at 56 attached to bell clappers 54—55, adapted to return said bell clappers to their normal position, after being tripped by trip blocks 50—51, which rings bell 2 at every change of the signal. Rods 57 are fastened to piston rods 42—43; connected to said rods are springs 58, the same being fastened to body casing 1 in any suitable manner, and are for the purpose of returning piston rods 42—43 to their normal position. Rods 59 are connected to piston rods 42—43 and to bevel blocks 60; said bevel blocks 60 operate arms 61, said arms having rollers 62 which travel back and forth on said bevel blocks 60; said arms 61 are fulcrumed near the center thereof, as shown at 63; at the upper end of said arms 61 are rollers 64. Said arms and said rollers are adapted to raise day signal 15 at each stroke of the pistons 42—43; said day signal 15 is hinged to body casing 1 as shown at 65 in Figs. 1-6, and is adapted to cover and uncover the night signals; lever rods 66 are fulcrumed at 67, said rods operate under guide rod 68, which is fastened to the rear of signal 15. Springs 69 are shown bearing against rods 66 and fastened to body casing 1; these springs are for the purpose of returning signal 15 to its normal position. Shaft 70 is held in place in body casing 1 by bearings 71—72, said night signal 14 being keyed to shaft 70. Night signal 14, has a pin fastened to the lower end thereof, as shown at 73, and a red glass 14ª, or any other suitable material that will show a red light when illuminated, fastened therein. On said shaft 70, and movable thereon are signals 16—17, said signals having a slot cut in the lower ends thereof, as shown at pin 73 strikes shoulder 76 of said slot 74, which is an integral part of signal 17, the same moves signal 17 into position shown in Fig. 3, signal 14 passing over signal 16. When pin 73 strikes shoulder 77 of slot 75, which is an integral part of signal 16, the same moves signal 16 into position shown in Fig. 6, signal 14 passing over signal 17. These signals are operated by shaft 70. A spring is shown at 78 connected to night signals 16—17 and is adapted to return said signals to their normal positions, as shown in Fig. 7. Arm shutter 18ª, exposing day signal 18 has its bearing on shaft 70, said arm shutter having a boss 79, which is an integral part of said shutter. Arm shutter 19ª covering day signal 19 has its bearing on shaft 70, said arm shutter having a slot 80 cut in the lower portion thereof adapted to allow boss 79 to pass back and forth therein; a boss 81 is shown on the lower portion of shutter 19ª; plate 82 is shown fastened to shaft 70 by set screw 83, said plate having a pin 84 fastened thereto adapted to operate arm shutters 18ª and 19ª when coming in contact with bosses 79—81, respectively. A spring is shown at 85 attached to bosses 79—81, adapted to return said arm shutters to their normal position. Bell 2 is fastened to shaft 70 by nut 86. Signal operating arm 87 is fastened to shaft 70 by set screw 88; springs 48—49 are fastened to said arm in any suitable manner and are for the purpose of receiving the sudden concussion of the outward strokes of pistons 42—43. Safety fulcrum rods are shown at 89—90 in Figs. 3-5; these rods are fulcrumed at 91—92, the same having engaging members 93—94 at the lower end thereof, and are adapted to engage the lower end of arm 87 for the purpose of preventing parts of two signals being exposed at the same time; these rods 89—90 are operated by bell clapper arms 54—55; when said arms 54—55 are released by trip blocks 50—51, said fulcrum rods 89—90 drop out of engagement with operating arm 87 and allow said arm to operate in either direction, as required.

Having thus described my invention, what I claim as new and desire to secure by Letters Patent, is:

1. In tail lights and signals of the class described, a casing having front and back plates, straps fastening said plates together, a light attached to said casing at the rear thereof, said casing being adapted to admit light to the interior thereof, a night stop signal, a day stop signal, a night left signal, a day left signal, a night right signal, a day right signal, means by which said night signals are operated, means by which said day stop signal is operated, shutters adapted to cover said day right and left signals, cylinders in said casing, piston rods in said casing having piston heads connected with said cylinders. means for admitting compressed air to said cylinders to actuate said piston rods, said piston rods being adapted to actuate the operating means of said signals and said shutters, a bell attached to said casing adapted to ring at every change of said signals, trip blocks fastened near the outer ends of said piston rods, bell clappers with which said blocks are adapted to contact on the outward stroke of said piston rods, and springs attached to said bell clappers adapted to return said bell clappers to their normal position, as and for the purpose described.

2. In tail lights and signals of the class described, a casing having front and back plates, straps fastening said plates together, cylinders and piston rods in said casing, rods attached to said piston rods, bevel blocks attached to said rods, springs attached to said rods and to said casing for the purpose of returning said piston rods to their normal positions, arms pivoted in said casing, said arms being provided at their ends with rollers, said bevel blocks being adapted to operate said pivoted arms, a day stop signal hinged to the upper part of said casing, said arms being adapted to raise said stop signal at each stroke of the piston rods, a night stop signal normally covered by said day stop signal, springs attached to said casing adapted to return said day stop signal to its normal position, a shaft in said casing, said night stop signal being keyed to said shaft, a pin attached to the lower end of said night stop signal, movable signals positioned on said shaft, said movable signals being provided at their lower ends with slots in which said pin operates, a spring connected to said movable signals adapted to return said movable signals to their normal positions, day signals upon said casing, shutters on said shaft adapted to cover said day signals, means by which said shutters are operated, and rods pivoted in said casing for holding said shaft in its normal positions, as and for the purpose described.

In testimony whereof I affix my signature in the presence of two subscribing witnesses.

WILLIAM E. HART.

Witnesses:
  L. R. ALLEN,
  L. H. BOGGS.